United States Patent
Poulbot et al.

(10) Patent No.: US 6,666,079 B2
(45) Date of Patent: Dec. 23, 2003

(54) TIRE COMPRISING A MEASUREMENT DEVICE

(75) Inventors: Valery Poulbot, Les Martres-d'Artiere (FR); Patrice Rey, Saint Jean de Moirans (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/190,862

(22) Filed: Jul. 8, 2002

(65) Prior Publication Data

US 2003/0056579 A1 Mar. 27, 2003

(30) Foreign Application Priority Data

Jul. 10, 2001 (FR) .............................. 01 09130

(51) Int. Cl.$^7$ .................... G01M 17/02; B60C 23/02
(52) U.S. Cl. .................. 73/146; 340/442; 340/447
(58) Field of Search .................. 73/146; 340/442, 340/447

(56) References Cited

U.S. PATENT DOCUMENTS

| | | | | |
|---|---|---|---|---|
| 5,864,056 A | * | 1/1999 | Bell et al. ................. | 73/146 |
| 5,877,679 A | * | 3/1999 | Prottey .................... | 340/442 |

FOREIGN PATENT DOCUMENTS

| | | |
|---|---|---|
| DE | 4012829 | 10/1991 |
| EP | 0937615 | 8/1999 |
| FR | 2211137 | 7/1974 |
| FR | 2784745 | 4/2000 |

OTHER PUBLICATIONS

Yao et al. "A novel three–dimensional microstructure fabrication technique for a trixial tactile sensor array," IEEE 1987.
Kovattana, "Trixial Force Sensor," 1982 Carnahan Conference on Security Technology, University of Kentucky, Lexington, Kentucky May 12–14, 1982.
English language abstract for FR 2 784 745, Apr. 21, 2000.
English language abstract for DE 4012829, Oct. 24, 1991.
Derwent Abstract for EP 0 937 615, Aug. 25, 1999.
U.S. patent application Ser. No. 10/071,134, filed Feb. 6, 2002, "Measurement of Adherence Beween a Vehicle Wheel and the Roadway," by Merino–Lopez et al.

* cited by examiner

Primary Examiner—Edward Lefkowitz
Assistant Examiner—Andre Allen
(74) Attorney, Agent, or Firm—Baker Botts L.L.P.

(57) ABSTRACT

A tire includes a nail-type force sensor embedded, for example, in an isolated element such as a tread pattern block (T11$_2$). The sensor comprises a rigid shank (1) designed to be acted upon by the force to be determined and a head (2). The head (2) comprises an element attached to the shank (1) capable of being deformed when the shank is displaced. This deformable element carries means to measure the deformation and comprises anchoring points which have a position relative to the shank (1) at rest and which essentially maintain that position when the shank (1) is displaced.

28 Claims, 9 Drawing Sheets

TIRE COMPRISING A MEASUREMENT DEVICE

BACKGROUND OF THE INVENTION

1. Technical Field of the Invention

The present invention concerns a tire equipped with a nail-type force measurement device.

2. The Related Art

U.S. Pat. No. 5,864,056 discloses a nail-type force sensor for tires, wherein the shank of the sensor is a flexible blade fitted with two strain gauges mounted back to back and the head of the sensor comprises at least two rigid discs transverse to the shank, separated by a tube orientated in the direction of the shank.

The major disadvantage of this structure is its lack of sensitivity along the axis of the shank. It can only pick up the components of a force located in a plane transverse to the axis of the shank. Now, it is important to know all of the components of the force, so that with one and the same sensor a lack of grip, for example, can be detected.

A nail-type force sensor for tires is also known from patent application EP-A-0 937 615. This nail-type sensor has a rigid shank, one end of which is free while the other end is attached to a head in the form of a first, electrically conducting plate transverse to the shank. This first plate cooperates with other electrically conducting plates positioned opposite and separated by a dielectric material, to form condensers. The shank is designed to be inserted by its free end into the tread of the tire. When the shank is acted upon by a force corresponding to a stress undergone by the tire tread, it displaces the first plate with it as it moves, whereby the values of the capacities of the condensers so formed vary. This structure, in its turn, has the following disadvantages.

The sensor is a macroscopic device. By its very presence, it can modify the mechanical behavior of the tread whose forces it is intended to measure. The various parts of the sensor cannot be assembled by microelectronic techniques.

This sensor only operates with condensers that require proximity processing electronics.

The dielectric may have electrical and elastic properties that vary with environment, temperature and humidity. These variations must be taken into account when interpreting the measurements.

SUMMARY OF THE INVENTION

The object of the present invention is to produce a tire provided with a nail-type force sensor which does not have the drawbacks of the prior art, in particular lack of sensitivity along the axis of the shank and uncertainty concerning the information it supplies.

In accordance with the invention, a tire is equipped with a nail-type force sensor comprising a rigid shank intended to be acted upon by the force to be picked up, and a head that comprises an element attached to the shank and is designed to be deformed or stressed when the shank is moved. The deformable element comprises means to measure the deformation or stress, and has anchoring points which have a given position relative to the shank at rest and which essentially preserve that position when the shank moves.

The application of the force to the shank at a certain distance from the deformable element and the anchoring of the deformable element at several points make it possible to determine not only the force component in a plane transverse to the shank but also the force component along the axis of the shank.

The anchoring points may be discrete or continuous along the edge of the deformable element.

The deformable element may be a full membrane or it can comprise radial arms connected together at a central area where the shank is attached. In the latter configuration, the anchoring points are located at the ends of the arms.

Four essentially orthogonal arms can be used. If there are three arms, it is preferable to space them essentially at intervals of 120° so as to obtain a certain symmetry around the axis of the shank.

The anchoring points are designed to cooperate with anchoring means, which can take the form, for example, of a cap, a frame or studs. The cap is particularly advantageous, notably because by fixing it on the anchoring points in an airtight way it contributes towards delimiting a hermetic cavity in which a controlled atmosphere can be maintained. The attachment between the cap and the anchoring points can incorporate at least one electrically conducting path.

The shank and the deformable element may be made on the basis of materials such as silicon, quartz, glass or a metal.

The measurement means can consist of at least three deformation or stress measurement devices distributed on the deformable element. Such measurement devices can be piezoelectric or piezoresistive gauges, condensers, or extensometric metallic gauges.

A particularly advantageous configuration is to make the deformable element of silicon and arrange the measurement devices along the <110> crystal axes of the deformable element.

Other characteristics and advantages of the invention will emerge on reading the description below, illustrated by the attached figures and drawings. The description is presented with illustrative and not limiting intent.

For the sake of clarity, the dimensions of the various elements are not drawn to scale.

DETAILED DESCRIPTION OF EXEMPLARY EMBODIMENTS

Figure 1A:
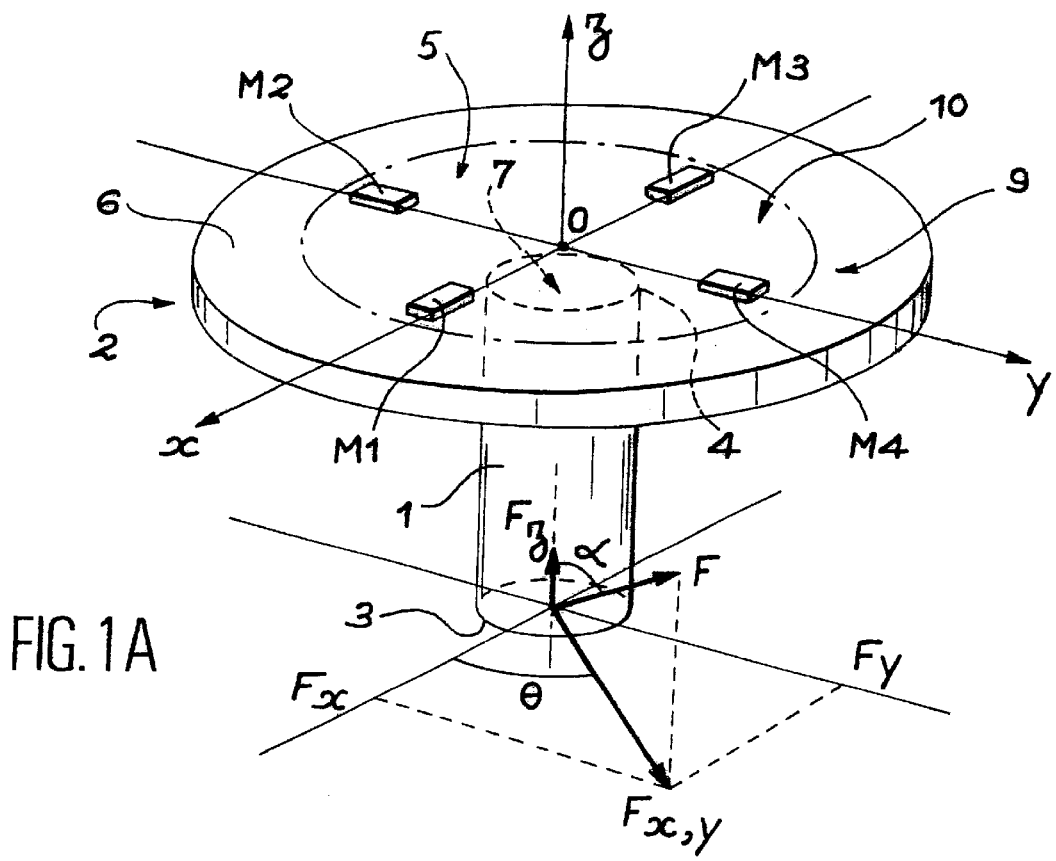
FIGS. 1A and 1B are schematic representations of a perspective and a sectional view, respectively, of an example of a force sensor in accordance with the invention.
Figure 1B:
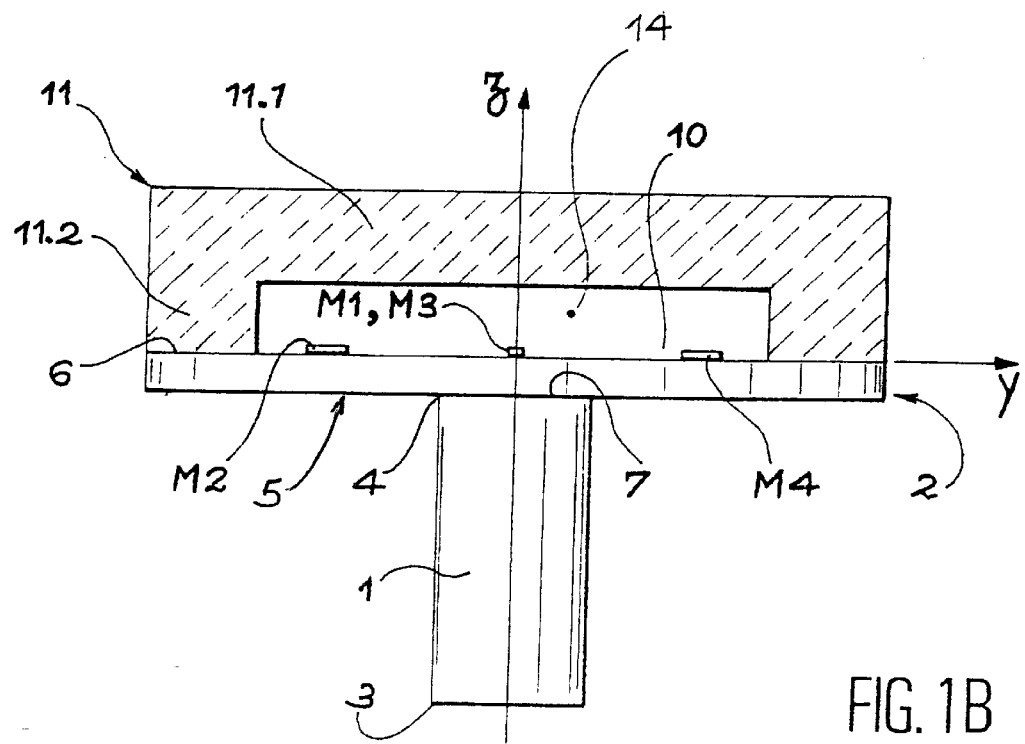

With reference to FIGS. 1A and 1B, the force sensor shown is of the nail type. It has a rigid shank 1 with a head 2 at one end. The shank 1 is directed along the z-axis. It has a free end 3 and its other end 4 is attached to the head 2. At the level of the head 2, the perpendicular axes (x, y) define a plane perpendicular to the z-axis.

The shank 1 is intended to be displaced by a force F which, in the most general case, is decomposed into a component $F_{(x, y)}$ in the plane (x, y) and a component $F_z$ along the z-axis. It is taken that the force F is directed at an angle α relative to the z axis and that the component $F_{(x, y)}$ is directed at an angle θ relative to the x-axis. Such a sensor enables the various components of the force F to be determined.

The point of application of the force F is a distance away from the end 4 of the shank 1 at which it is attached to the head 2.

The head 2 of the force sensor comprises an element 5 which can deform when the shank 1 is acted upon by the force F. It is this element 5 which is connected to the shank 1. In the example of FIGS. 1A and 1B, the deformable element 5 is a full circular membrane. It is attached to the shank 1 at a central area 7. The deformable element 5 is orientated essentially orthogonally to the shank 1 when the latter is in its rest position with no force acting on it.

The deformable element 5 has anchoring points 6 which have a position relative to the shank 1 at rest and which essentially maintain that position while the shank 1 is acted upon by the force F. In FIG. 1A, there are a multitude of continuous anchoring points 6 spread over a peripheral zone 9 at the edge of the membrane 5. With such a deformable element the anchoring points could also be discrete.

The deformable element 5 has means M1, M2, M3, M4 for measuring the deformation it undergoes. In FIG. 1A, these measurement means consist of four measurement devices spaced apart by a known angle, for example 90°. They are located in a median zone 10 between the area 7 where the shank 1 is attached and the peripheral zone 9 of the anchoring points. The shank 1 is attached on one face of the deformable element 5 while the measurement means M1, M2, M3, M4 are on another face opposite the first. The measurement means and the shank could have been located on the same face of the deformable element.

To preserve rotational symmetry, it is preferable to position the various measurement devices M1, M2, M3, M4 the same distance from the center O of the membrane 5.

The measurement devices M1, M2, M3, M4 may be stress gauges of the piezoresistive type. Their resistance will then vary as a function of the deformation or stress they undergo. Alternatively, they may be of the piezoelectric type which generate a current or voltage that varies as a function of their deformation. Other measurement devices can be used, for example metallic or extensometric gauges. Other measurement devices could be used.

The anchoring points 6 are designed to cooperate with anchoring means which may or may not be part of the force sensor according to the invention. The anchoring means can only be seen in FIG. 1B. They take the form of a rigid cap 11 with a bottom 11.1 and a base 11.2. More precisely, it is the base 11.2 of the cap which is attached to the periphery of the membrane 5. This attachment may be by adhesive bonding, brazing, sealing, etc.

An advantage of the cap 11 is that it plays a part in protecting the measurement devices M1, M2, M3, M4. The cap is thick enough and the anchoring points rigid enough to avoid any displacement of the membrane at the level of the anchoring points 6 when it is shifted by the movement of the shank under the action of a force.

Another advantage of the cap 11 serving as the anchoring means is that, together with the deformable element 5, it can delimit a hermetic cavity 14 by forming an airtight seal with its anchoring points 6. The deformable element 5 is a full circular membrane and the anchoring points 6 are continuous along its edges. The presence of the hermetic cavity 14 enables special strain gauges to be kept under any specific atmosphere they might require or to keep them in particular conditions, for example by providing thermal insulation. The hermetic cavity 14 may, for example, be evacuated or filled with a neutral gas.

The measurements yielded by the measurement devices M1 must be processed in order to be of any use. The cap 11 may incorporate some or all of an electronic processing circuit, in a manner analogous to that shown in FIG. 2B, where the cap 11 comprises a second electrode 8.2 placed opposite a first electrode 8.1 on the deformable element 5. Such a processing circuit can be located inside the hermetic cavity 14 and fixed on the inside wall of the bottom 11.1 of the cap 11. It is electrically connected to the measurement means M1 via at least one electrical connection passing through the seal. Continuity of the connection can be achieved by a conducting ball embedded in the seal.

The electronic processing circuit conveys information to the outside of the hermetic cavity 14 via a connection passing through the attachment between the cap 11 and the anchoring points 6. The connection terminal is then located on the outside of the hermetic cavity 14, on the same side as the shank 1. A connection carried by the anchoring points 6 at the edge of the membrane 5 can also be implanted. This configuration allows easy connection on the side carrying the shank 1 or on the side facing away from the free end 3 of the shank 1.

The fact that information provided by the sensor can be recovered on either side of it enables a wide variety of configurations.

The cap 11 can be made on the basis of materials such as silicon, quartz, glass or metal. An advantage of silicon is that it allows the electronic processing circuit to be integrated in the cap itself.

Other types of anchoring can of course be envisaged.

For example, in practice the sensor may embody certain differences or additional components compared with the embodiment illustrated in FIGS. 1A and 1B. The sensor comprising a base 2 and a shank 1 may be embedded in a block of square shape which extends the peripheral part constituting the anchoring points 6 and forms a thicker portion. The cap 11 can then be formed by a lid with no base 11.2 directly bonded to the thicker portion.

Figure 5:
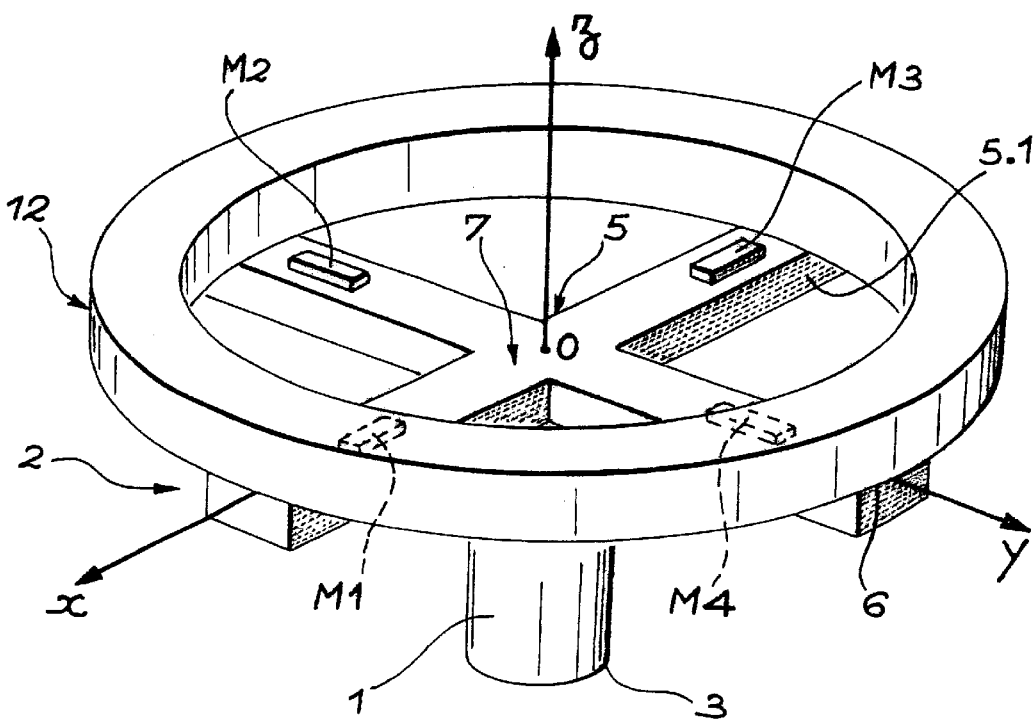
FIG. 5 shows a perspective view of a third example of a force sensor in accordance with the invention.
Figure 6:
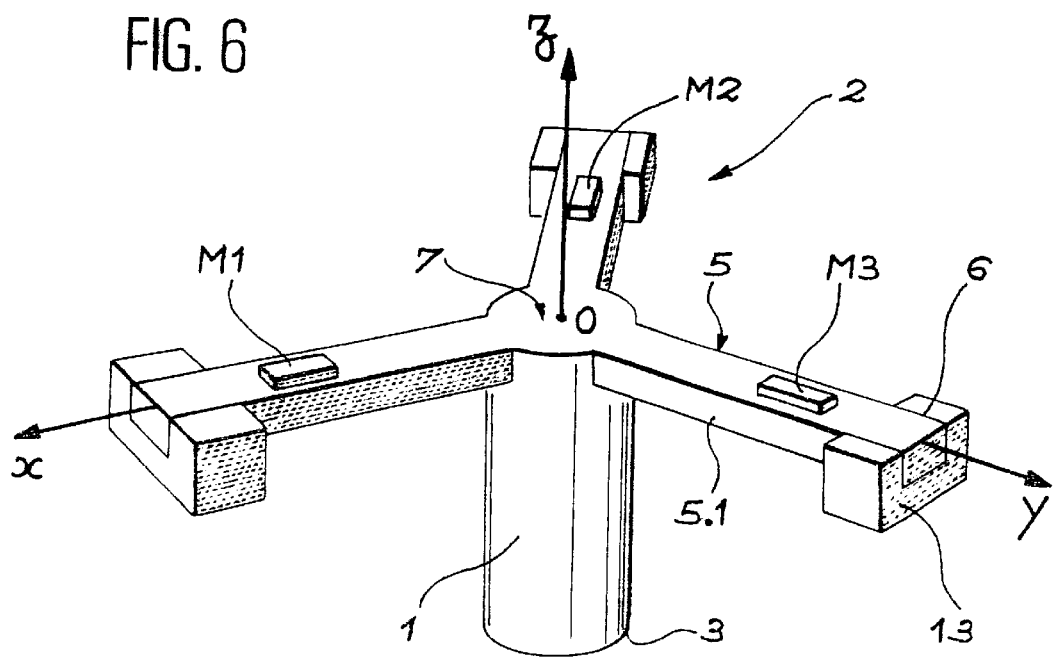
FIG. 6 shows a perspective view of a fourth example of a force sensor in accordance with the invention.

Other variants can of course be envisaged, as shown by FIGS. 5 and 6 described below.

The shank 1 can be made on the basis of materials such as silicon, quartz, or a metal such as stainless steel.

The deformable element 5 may also be made on the basis of those materials, but does not necessarily have to be of the same material as the shank 1.

Simulations have been carried out with a force sensor similar to that of FIGS. 1A and 1B, with a shank 1 and membrane 5 made of silicon. The cap is also made of silicon.

The membrane dimensions (to measure a force of the order of 100 N) are as follows:

| |
|---|
| Radius: 1 millimeter |
| Thickness: 50 micrometers |

Width of the anchoring zone: 500 micrometers. This dimension corresponds to the width of the cap at its base.

The dimensions of the shank are as follows:

| |
|---|
| Length: 500 micrometers |
| Radius: 200 micrometers |

The dimensions of the cap are as follows:

| |
|---|
| Thickness of the cap at the level of its bottom: 300 micrometers |
| Cap clearance: 200 micrometers. |

The measurement devices, of which there are four, are piezoresistive gauges positioned along the <110> crystal axes of the silicon membrane at the same distance from the center O of the membrane.

Figure 3:
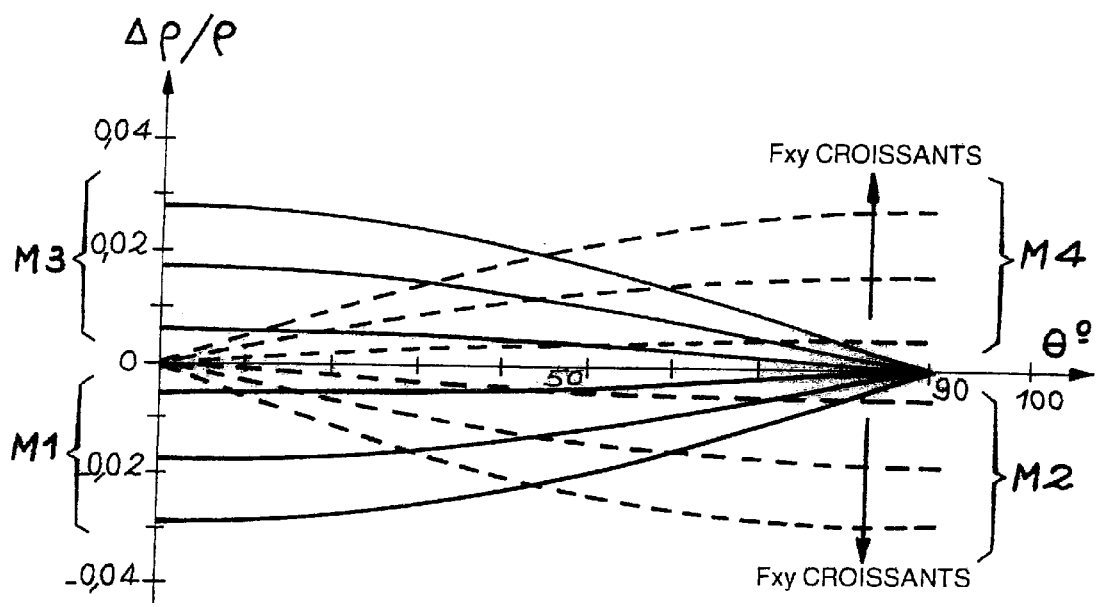
FIG. 3 shows, for the force sensor of FIGS. 1A and 1B, the variations of the resistivity of the gauges as a function of the angle, in the plane (x, y) transverse to the axis of the shank, between the force and the x-axis for several values of the intensity of the force component in the plane (x, y).

The curves of FIG. 3 illustrate the variation of the resistivity $\Delta\rho/\rho$ of the four gauges M1, M2, M3, M4 when the shank is acted upon by a force $F_{(x, y)}$ ($F_z=0$) making an angle $\theta$ that can vary between 0° and 90° relative to the x-axis. The gauges M1 and M3 are diametrically opposite one another on the x-axis and the gauges M2 and M4 are diametrically opposite on the y-axis. Three curves have been shown for each gauge, corresponding to two extreme values and an intermediate value of forces in the plane (x, y).

These bundles of curves are symmetrical with respect to $\Delta\rho/\rho=0$ and $\theta=45°$.

A given force $F_{(x, y, 0)}$ making an angle $\theta$ relative to the x-axis induces variations of the resistivity that are equal and opposite at the level of two gauges located symmetrically relative to the center O of the membrane on the same axis passing through the center O.

Other simulations carried out, in which the angle $\theta$ was varied as a function of the force $F_{(x,y,0)}$ while keeping $\Delta\rho/\rho$ constant, show that two gauges not aligned with the center of the membrane, preferably positioned on orthogonal axes (x, y), enable determination of the pair of values $F_{(x, y, 0)}$ and $\theta$ that characterizes a force F of any intensity and orientation in the plane (x, y) passing through "0".

Figure 4:
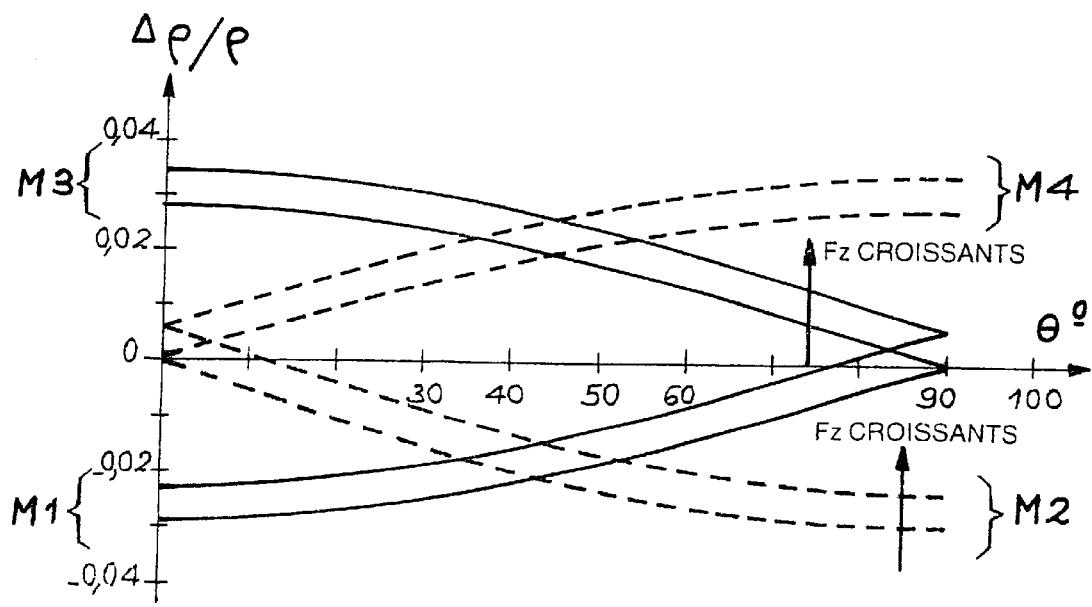
FIG. 4 shows, for force sensor of FIGS. 1A and 1B, the variations of the resistivity of the gauges as a function of the angle, in the plane (x, y) transverse to the axis of the shank, between the force and the z-axis for several values of the intensity of the force component in the plane (x, y).

The curves of FIG. 4 show in the same way as those of FIG. 3 how the resistivity $\Delta\rho/\rho$ of the four gauges M1, M2, M3, M4 varies as a function of the angle $\theta$ for different values of a force $F_z$ when $F_{(x, y)}$ is constant. For given values of $F_{(x, y, 0)}$ and $\theta$, the application of a force $F_z$ along axis z induces a variation of the resistivity $\Delta\rho/\rho$ that is identical for each of the stress gauges M1, M2, M3, M4.

As has been seen earlier, two stress gauges arranged symmetrically with respect to the center O, either on the x-axis or on the y-axis, undergo equal and opposite variations for any $F_{(x, y, 0)}$ and $\theta$.

From these two properties it can be shown that the mean of the resistivity variations $\Delta\rho/\rho$ of a pair of stress gauges arranged on the same axis x or y symmetrically with respect to the center O is proportional to $F_z$.

The measurements given by a pair of diametrically opposed measurement devices M1, M3 enable $F_z$ to be known, while those given by a pair of measurement devices M1, M2 located on orthogonal axes enable $F_{(x, y)}$ and $\theta$ to be known. With such a structure, only three measurement devices suffice to determine $F_{(x, y)}$, $F_z$ and $\theta$.

Other measurement device distributions are of course possible for the determination of $F_{(x, y)}$, $F_z$ and $\theta$, as shown by FIG. 6.

The configuration with a deformable element made of silicon is especially advantageous because silicon is a material with a high breaking stress. It can be manufactured in a simple way. The sensor can easily be miniaturized.

Figure 2A:
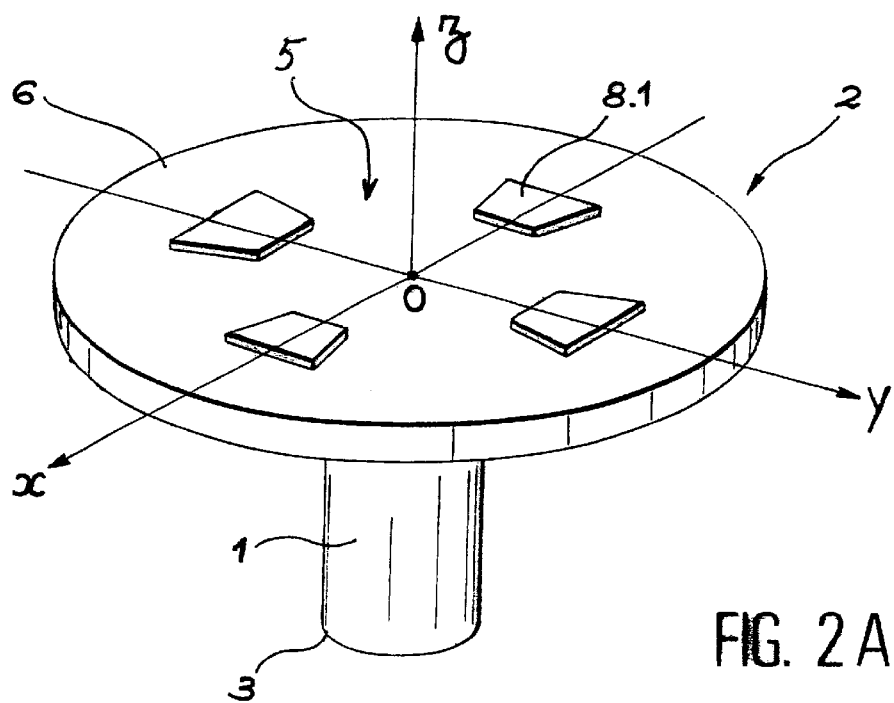
FIGS. 2A and 2B are schematic representations of a perspective and a sectional view, respectively, of another example of a force sensor in accordance with the invention.
Figure 2B:
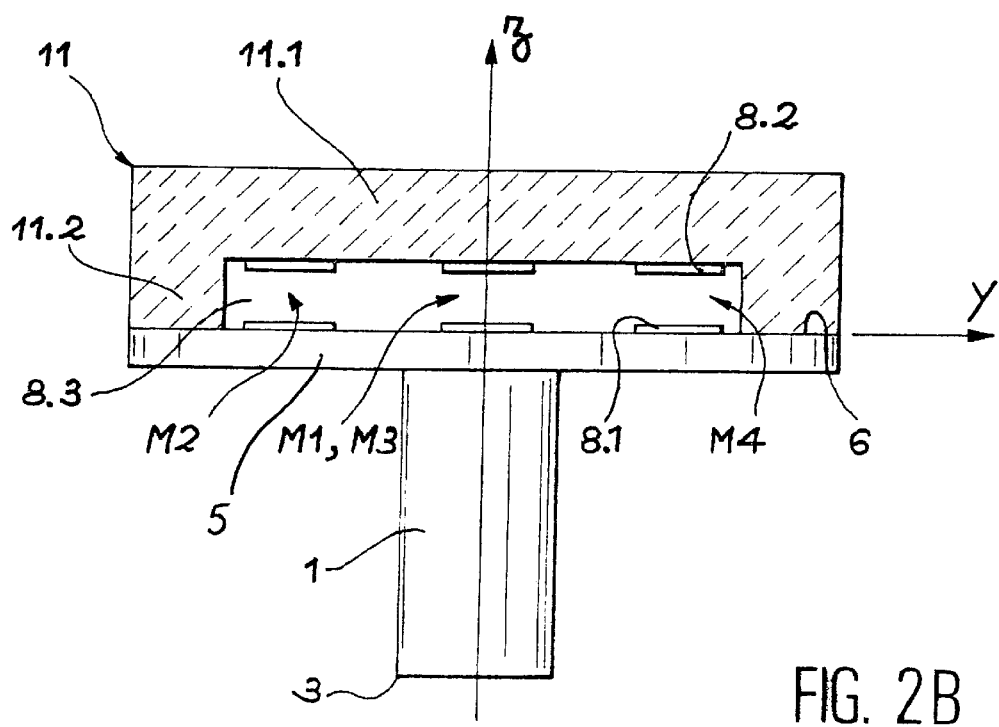

Reference will now be made to FIGS. 2A and 2B, which show a first variant of a force sensor according to the invention. This sensor is similar to that of FIGS. 1A and 1B. Again, it has a shank 1 and a head 2 with the deformable element 5 in the form of a full circular membrane. The anchoring points 6 are identical to those in the previous example, and the cap 11 is again shown in FIG. 2B. It cannot be seen in FIG. 2A.

The main difference is at the level of the measurement devices M1, M2, M3, M4 for the deformation undergone by the deformable element 5 when the shank 1 is acted upon by a force. The measurement devices in FIGS. 2A and 2B consist of condensers, whose respective first electrodes 8.1 are on the deformable element 5 while their second electrodes 8.2 are placed opposite. The two electrodes 8.1, 8.2 opposite one another are separated by a dielectric medium 8.3.

In the example of FIG. 2B, the second electrodes 8.2 of the condensers are carried by the bottom 11.1 of the cap 11 on its inside face and the dielectric medium 8.3 consists of the gaseous medium present in the cavity 14 delimited by the cap 11 and the membrane 5. The cavity 14 is then sealed. This dielectric medium may be a vacuum, or chosen from among one or more of the gases: air, or a neutral gas such as argon or nitrogen for example.

It could be envisaged to have a solid dielectric medium (for example an insulating polymer) instead of a gas or vacuum, with the electrodes in contact with it. As a solid dielectric medium, a polymer for example could be used.

When the shank 1 is displaced, it brings about a movement of the membrane 5 which, in deforming, displaces the first electrodes 8.1 of the condensers. This displacement causes the value of their capacitance to vary.

Reference is now made to FIGS. 5 and 6, which show other examples of force sensors according to the invention.

As in FIGS. 1 and 2, there are the shank 1, the head 2 comprising a deformable element 5 that supports means M1, M2, M3, M4 for measuring its deformation, and anchoring points 6. This time, however, the deformable element 5 has radial arms 5.1 connected to one another in a central area 7 where the shank 1 is attached. The arms 5.1 have essentially the same length. In FIG. 5 the deformable element 5 is cruciform with four essentially orthogonal arms. The measurement means M1–M4 consist of as many measurement devices as there are arms. Each arm 5.1 has a device M1, M2, M3, M4 to measure the deformation it undergoes when the shank 1 is displaced. These measurement devices have been represented as of the same nature as in FIGS. 1, i.e. piezoelectric, piezoresistive, metallic or extensometric, but they could just as well be of the capacitance type.

The anchoring points in this case are discrete, being located at the ends of the arms 5.1. The anchoring means take the form of a frame 12 to which the ends of the arms are fixed. It is rigid enough for the anchoring points 6 to maintain essentially the same position relative to that of the shank 1 at rest, whatever the position adopted by the shank when it is displaced. The frame 12 can be annular or square, and may be made of metal, quartz, silicon or glass. Such a frame could have been used instead of the cap with a full membrane analogous to that shown in FIGS. 1A and 1B.

Instead of the deformable element 5 having four arms and being equipped with four measurement devices, it is sufficient, as shown in FIG. 6, to have three arms 5.2 and therefore three measurement devices. Three measurement devices distributed appropriately suffice to determine all the characteristics $F_{(x, y)}$, $F_z$ and * of any force F.

The three arms 5.1 essentially form a letter Y and are spaced at intervals of approximately 120°. The arms are essentially the same length. The anchoring points 6 are at the ends of the arms 5.1. It can be envisaged that the anchoring points 6 cooperate with anchoring means that are not part of the force sensor. In FIG. 6, the anchoring means 13 are in the form of sockets into which the ends of the arms 5.1 fit. These sockets 13 could, in a control lever application for example, be carried by the base.

A description will now be given of how the miniature sensor presented above can be intimately integrated into a tire in as unintrusive a manner as possible, such that the normal primary function of the tire is not essentially modified.

Figure 7:
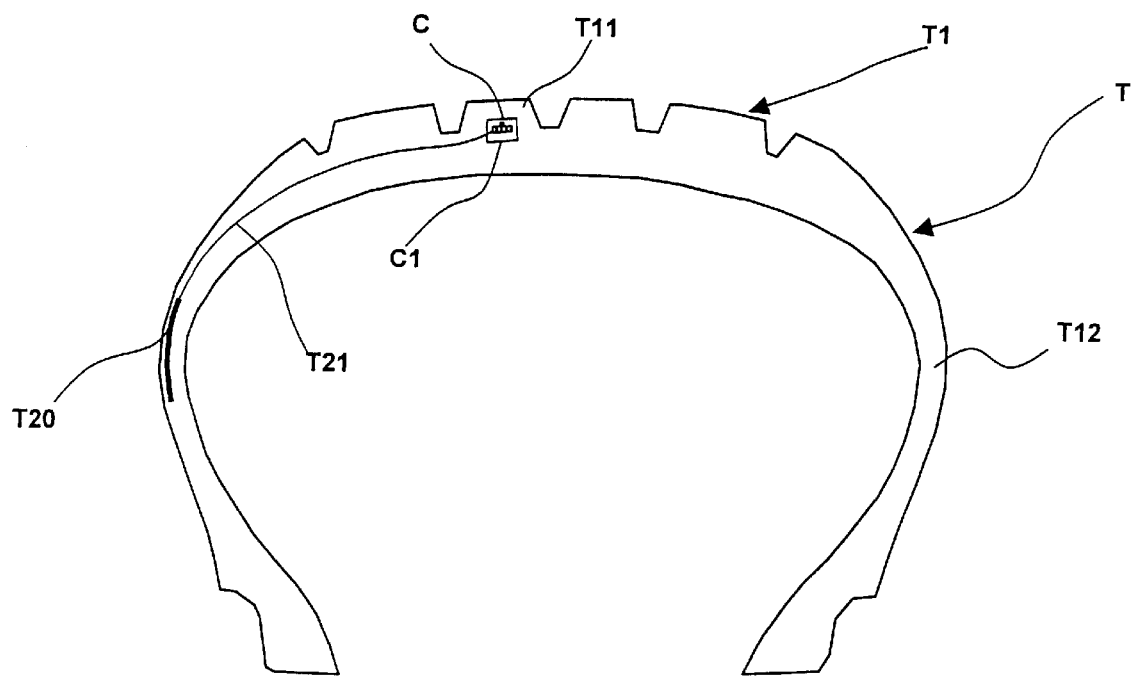
FIG. 7 represents a meridian section of a tire whose tread is fitted with a sensor in accordance with the invention, showing a first way to position the sensor in a pattern element of the tire tread.

FIG. 7 shows a tire T provided with a tread T1. The tread comprises a pattern element T11, namely a rib which, for example, extends all around the tread. The pattern element T11 has a sensor C preferably inserted in an area not subjected to wear, as shown in greater detail in FIG. 8, which represents only the pattern element T11 in contact with the ground. The tire T has a reinforcement armature T13, which generally consists of textile and/or metallic cords embedded in a filled elastomer. It goes without saying that the reinforcement armature is not in itself part of the present invention. There is no need, therefore, to describe all its possible designs in the context of the invention.

Figure 8:
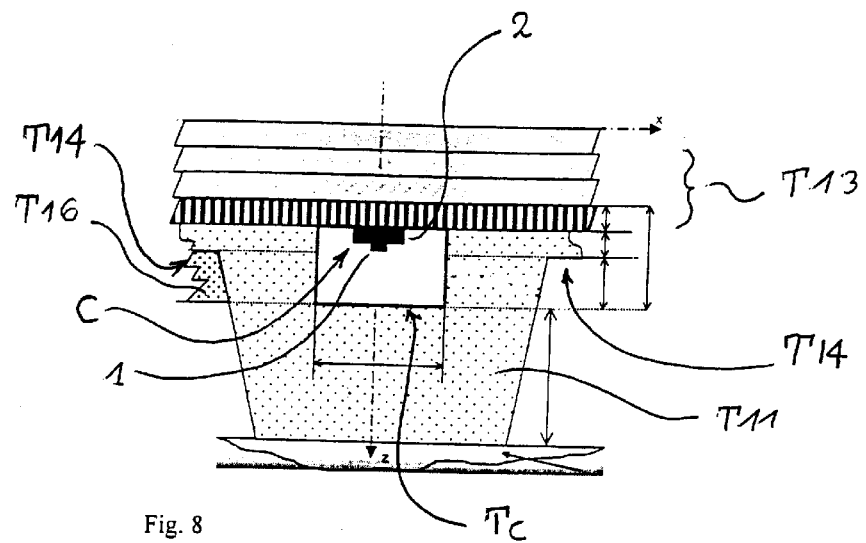
FIG. 8 is an enlarged view of part of FIG. 7, showing the implantation of the sensor in greater detail.

FIG. 8 also indicates schematically a wear control element T16 consisting, as is well known in its own right, of an excess thickness of rubber molded at the bottom of a pattern groove T14. The enclosed area $T_C$ represents the preferred insertion zone of the sensor C into the tread T1.

During the manufacture of tires, various stages are known, including a stage that consists in winding the tread onto a tire blank. At that stage, the tire is said to be uncured. Then, it is molded and vulcanized in a curing press by means of a mold. During manufacture, the sensor C can be positioned on the reinforcement armature T13 just before the stage when the tread T1 is wound on. Those with knowledge of the field will be able to adapt the sensor insertion technique in accordance with the tire manufacturing process in use.

At the very beginning of vulcanization during the tire molding process, the filled elastomer constituting the tread can undergo fluid displacements under the conjoint action of the molding pressure and the temperature increase. To prevent the sensor from being displaced from its initial position in the uncured casing, an insert C1 can be made which is pre-molded and at least partially vulcanized and which contains the sensor (see FIG. 7). The insert C1 comprises a small volume of filled elastomer, preferably having the same composition as that of the tread. The insert may contain a base, one or more spikes or an accessory, as described below. Such a pre-molded insert can facilitate a precise relative positioning of the various components it contains, and also favors the precise positioning of all these components in the tire. The insert C1 is of course implanted in the enclosed area $T_C$.

It is also possible to opt for a technique inspired by re-capping. A tread containing the components described above is pre-molded or even pre-vulcanized, at least partially, and then positioned on a tire blank and the whole is then vulcanized to fix all these elements firmly together.

To promote good transmission of the forces undergone by the filled elastomer in which the sensor is inserted to the sensitive part of the sensor, a pretreatment may be applied to the surface of the sensor and the various components possibly used, for example with a commercially available product such as Chemosyl or any other product intended to ensure cohesion between a filled elastomer and some other element. A further advantage of such a treatment is to ensure good mutual cohesion of the various constituents of the tire, including the added elements, and so to ensure good tire endurance in use.

Thus, the sensor C is located in part of the tire tread which is not subject to wear during normal use of the tire. The sensor C itself is represented schematically in this zone, without prejudice to its exact size relative to the pattern element T11 since tread pattern elements can vary greatly in size and shape depending on the type and size of the tire.

In FIGS. 7 and 8 the sensor C is shown centered relative to the pattern element T11 for illustrative purposes. It goes without saying that the sensor can occupy a non-centralized position relative to a pattern element, whether this be in the longitudinal or the transverse direction of the element. It can be positioned with its shank 1 orientated towards the surface of the tread T1 as in FIGS. 7 to 9 and 13 to 15, or the other way round, as in FIGS. 10 and 11.

Figure 9:
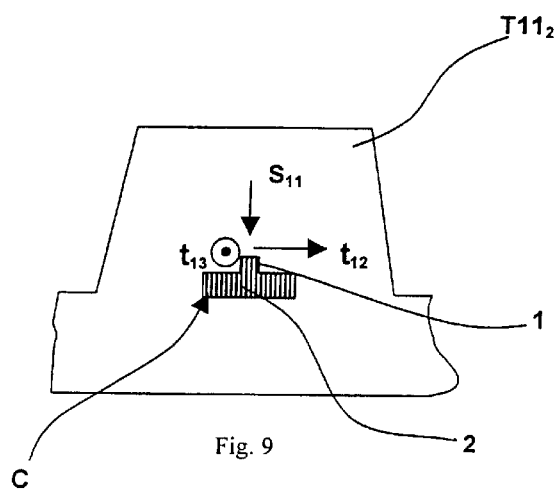
FIG. 9 shows a second way to position such a sensor in a pattern element of a tire tread.

Looking at FIG. 9, it can be seen that the sensor C enables three stresses to be measured: one compression stress indexed $s_{11}$ and two shear stresses indexed $t_{12}$ and $t_{13}$. This sensor, located in a part of the pattern element T11 not subjected to wear, enables the stresses present in this pattern element to be measured throughout the life of the tire, or at least a representation of them to be obtained which is faithful enough to be applied usefully. The sensor C provides an indication of the force exerted perpendicularly to the contact area of the pattern element T11 with the ground, and indications of the tangential forces applied to the pattern element in the contact area.

When applied to a tire of the type described in patent application EP1076235A1, it is possible to estimate, for example, the gripping power of the pattern element and the gripping power of the tire.

Figure 11:
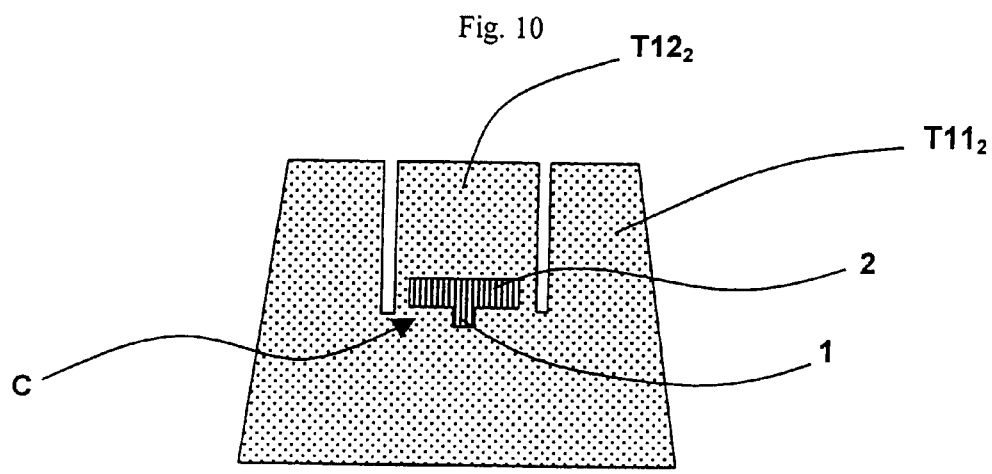
FIGS. 11 and 12 show a fourth way to implant such a sensor in a tire tread whose pattern is adapted for the purpose.
Figure 12:
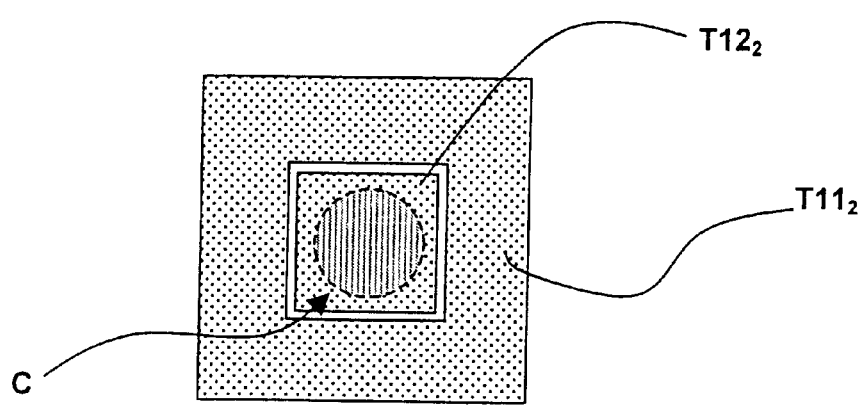

The sensor C can be inserted in a pattern element T11 taken to be circumferentially continuous around the tread T1, as in FIGS. 7 and 8, or, alternatively, in an isolated element, as in the pattern block T11$_2$ of FIG. 11. Both types of pattern elements are described in U.S. patent application Ser. No. 10/071,135. That application also describes an element such as the pattern block T11$_2$ in FIG. 12 comprising a central portion T12$_2$, and its utility for evaluating the friction potential of that element and the gripping power of the tire. The pertinent portions of U.S. application Ser. No. 10/071,135 are hereby incorporated by reference.

It must also be stressed that the choice of the direction in which the sensor is implanted does not depend on the type of the pattern element with which it is associated; only its calibration may depend on the implantation direction and on the type of pattern element with which it is associated. It should also be stressed that there is no need to implant a body separate from the sensor to impose upon it the deformation(s) or force(s) to be measured, in contrast to some previously known solutions.

Figure 10:
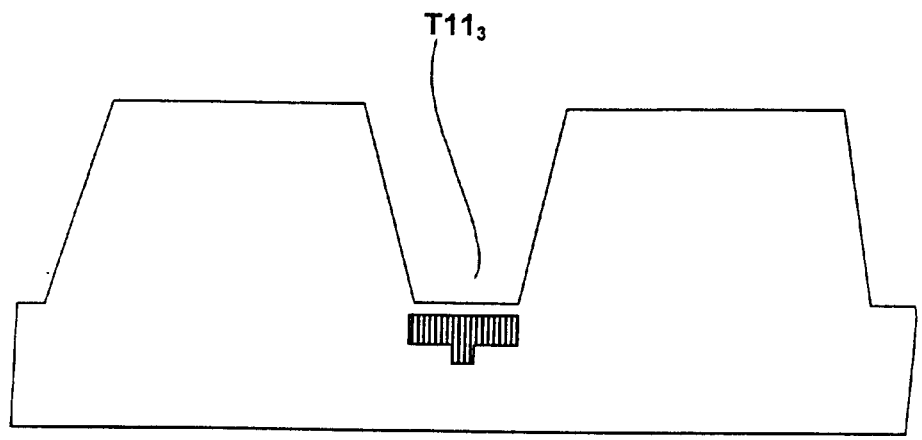
FIG. 10 shows a third way to position such a sensor in a tire tread.

FIG. 10 shows that the sensor C can also be positioned between two pattern elements (blocks or ribs) which are adjacent in the longitudinal or transverse direction of the tread. Here again, the shank may be orientated towards the surface of the tread or, just as well, towards the reinforcement armature.

What is essential is that the sensor should be inserted in an area of the tread not subject to wear, so as to guarantee its operation throughout the life of the tire in normal use. For a tire comprising a reinforcement armature and a tread, the tread having a portion designed to undergo wear, the sensor must therefore be arranged in the tread between the portion designed to undergo wear and the reinforcement.

Figure 13:
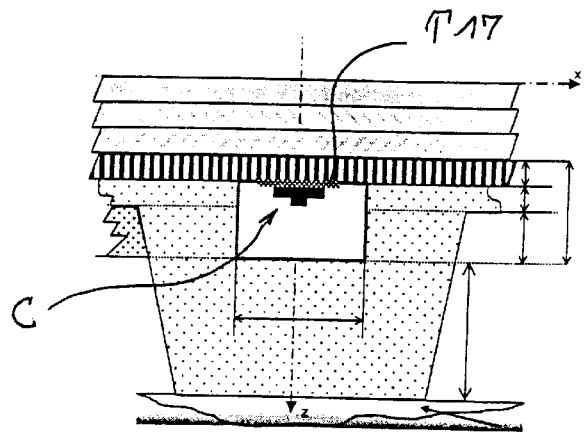
FIG. 13 shows a fifth way to position such a sensor in a tire tread.

According to a variant of the invention illustrated in FIG. 13, a rigid or semi-rigid accessory T17 larger than the sensor itself can be added to the sensor, notably in order to facilitate its positioning during the manufacture of the tire and, in particular, to prevent it from being displaced during the tire molding stage. The accessory T17 can be made of metal, polymer or even ceramic. Its rigidity should preferably be greater than that of the filled elastomer constituting the tread T1, and its area should exceed the maximum area of the sensor C. Here, too, the implantation direction of the shank 1 of the sensor C shown in FIG. 13 is not a limiting factor.

Figure 14:
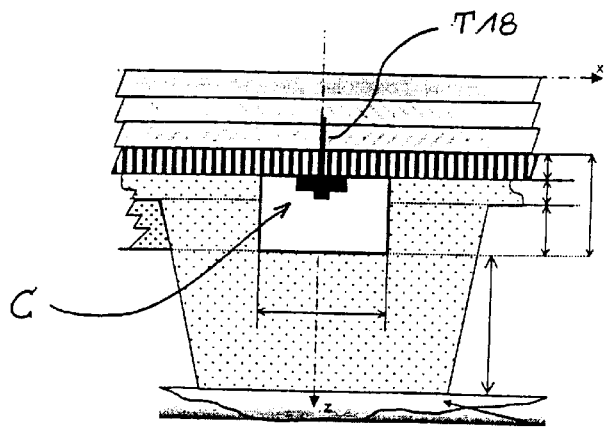
FIG. 14 shows a sixth way to position such a sensor in a tire tread.

According to another variant illustrated in FIG. 14, the sensor C can also be provided on its outer face with one or more spikes T18 to facilitate its positioning during the manufacture of the tire and to prevent its displacement during the molding stage. The spike(s) T18 preferably consist(s) of a fairly rigid material, for example a metal, ceramic, polymer or even silicon. In a more particular arrangement of this variant, the spike can end in a head or hook designed to ensure still better positioning and positional stability during the tire's molding and curing.

If desired, the two sensor implantation variants described above can be combined.

Figure 15:
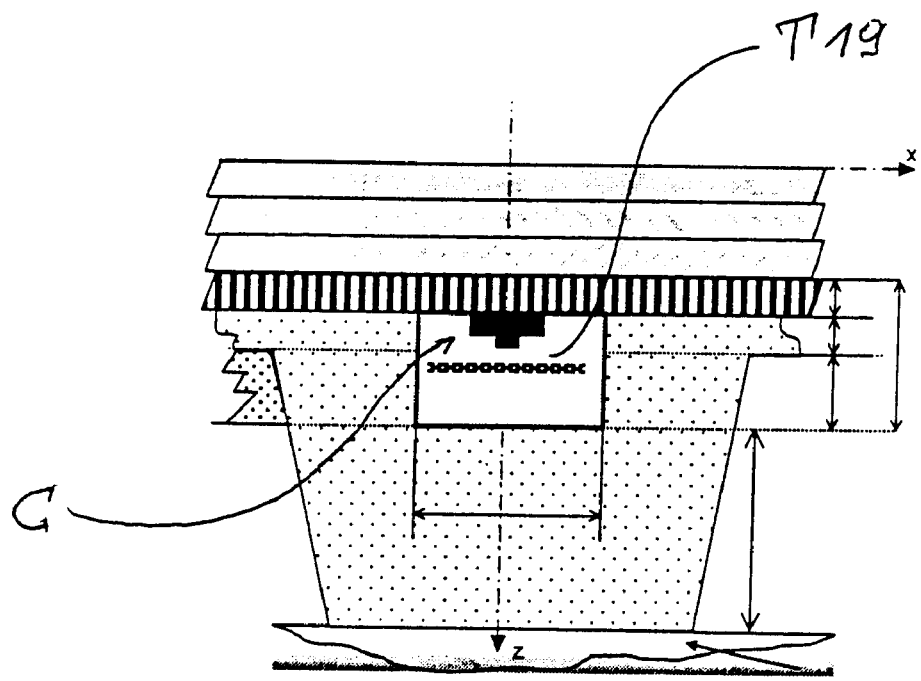
FIG. 15 shows a seventh way to position such a sensor in a tire tread.

Finally, according to another aspect illustrated in FIG. 15, which is totally independent of the choice of how to implant the sensor C, it may be desirable to associate with the sensor C a base T19 formed, for example, of a rigid or semi-rigid plate. Here, too, the base T19 should be positioned in the non-wearing part of the tread between the sensor and the ground. An advantage of such a base T19 is that it moderates the forces transmitted to the sensor along its vertical axis by the filled elastomer of the tread. Another advantage is that the sensor is protected when the tire rolls over a stone or the like. A particularly pointed stone can give rise, during rolling, to particularly high local vertical stress fields in a pattern element, which are transmitted to the sensor via the filled elastomer constituting the tire's tread pattern and could destroy the sensor. The material of the rigid or semi-rigid plate element can, for example, be a metal, ceramic, polymer, silicon or even a composite consisting of a filled elastomer matrix and a material such as those used to produce tire reinforcements. Needless to say, the rigidity of the base T19 should be greater than that of the filled elastomer constituting the tread. The base T19 must be capable of moderating the stresses transmitted by ground projections. The area of the base T19 is preferably at least equal to that of the sensor, and preferably at most equal to the area of the pattern element T11.

The operation of the sensor entails, as a minimum, an electronic measurement circuit, a power supply system and a system for coding the data and transmitting them to the vehicle.

As regards the measurement electronic circuit, this can be in the form of a very small ASIC. It can either be bonded to the sensor itself, for example in the insert, or positioned beside it, always preferably opposite the sensitive part of the sensor.

The sensor can be supplied with energy from a cell or micro-battery inserted with the sensor C, for example in a pre-molded insert. Connections similar to those described earlier can be provided to connect the sensor to the energy source. The data can be transmitted to the vehicle by classical teletransmission methods. The information coding electronics are integrated in the form of a ASIC and connected to an antenna, for example an antenna of the quarter-wave electric field type, positioned within the tread. All these elements are preferably integrated with the sensor and the measurement electronics in an insert as described above. The material and shape of the antenna are chosen so as not to degrade the endurance of the tire.

Another solution is to tele-power the sensor by means of the classical tele-powering process. For example, an antenna T20 of the loop type (see FIG. 7), known as the secondary antenna, could be positioned in the filled elastomer mixture constituting a sidewall T12 of the tire T, or under the tread T11. This secondary antenna is electrically connected to the sensor circuitry by a cable T21 constructed such that it too does not modify the mechanical behavior of the tire during rolling. An antenna known as the primary antenna (not shown) is positioned on the vehicle opposite the secondary antenna. The power source is inside the vehicle, for example its battery. Power is transmitted from the fixed primary antenna positioned on the vehicle to the secondary antenna T20 rotating with the tire and electrically connected to the sensor, by inductive coupling. In such a case, the data are transmitted via the same antennae, for example by modifying the frequency or amplitude of the power signal.

Figure 16:
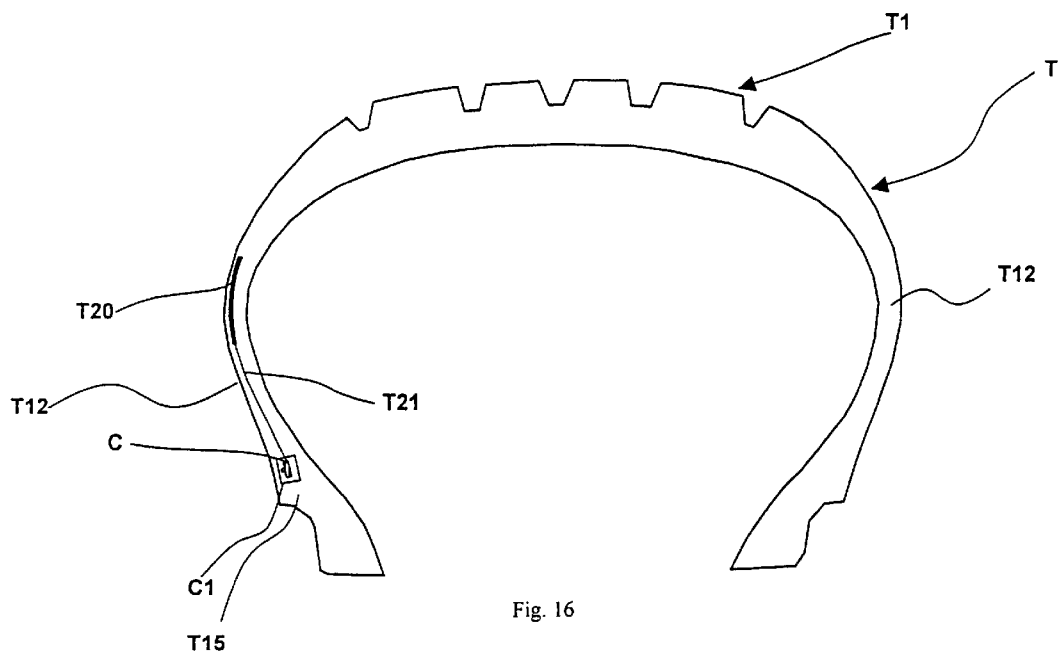
FIG. 16 shows a way to position such a sensor between the sidewall and the bead of a tire.
Figure 17:
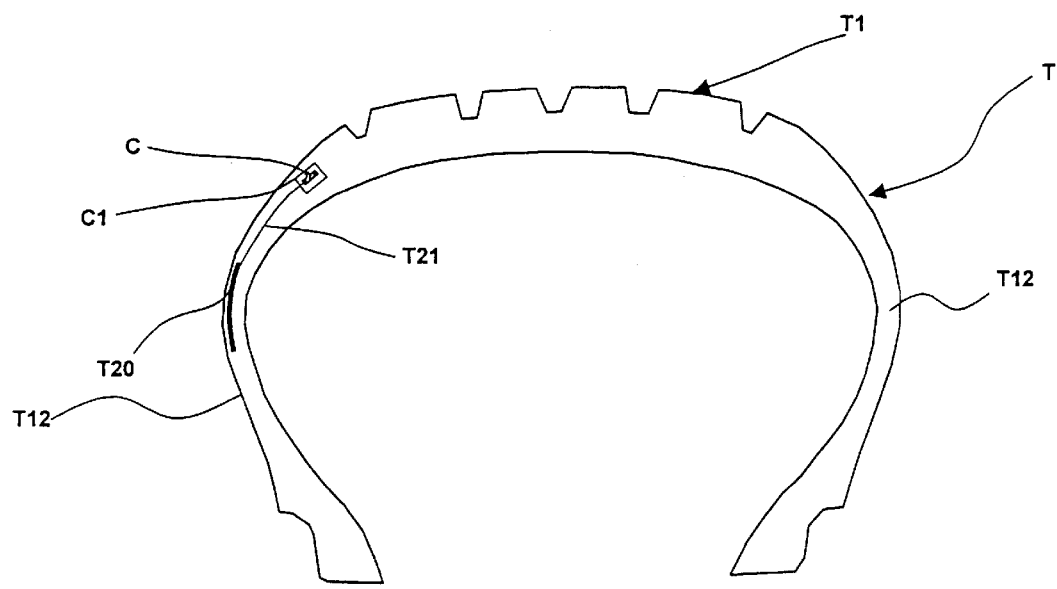
FIG. 17 shows a way to position such a sensor in a shoulder of a tire.

Among numerous possible implantation variants, FIGS. 16 and 17 show two other implantations in a non-wearing part of the tire. In FIG. 16, the sensor C is inserted between a sidewall T12 and the bead T15. In FIG. 17, the sensor C is inserted between a sidewall T12 and the tread T1, i.e. in the shoulder of the tire. Clearly, the intention is not to make measurements in the tread. Whatever the zone of the tire within which it is implanted, the sensor C enables the compression stress $s_{11}$ and the two shear stresses $t_{12}$ and $t_{13}$ (see FIG. 9) to be measured at the point where the sensor is implanted. It is also clear that the sensor can be connected to an antenna T20 by a cable T21.

What is claimed is:

1. A tire comprising a force sensor, said force sensor comprising a rigid shank designed to be acted upon by a force and a head, the head comprising an element attached to the shank designed to be deformed or stressed when the shank is displaced, the deformable element carrying means to measure said deformation or stress and comprising anchoring points which have a position relative to the shank at rest and which essentially maintain that position when the shank is displaced.

2. A tire according to claim 1, wherein the anchoring points are discrete.

3. A tire according to claim 1, wherein the anchoring points are continuous along the edge of the deformable element.

4. A tire according to claim 1, wherein the deformable element is a full membrane.

5. A tire according to claim 4, wherein the full membrane is circular.

6. A tire according to claim 1, wherein the deformable element has radiating arms connected together in a central area where the shank is fixed, and the anchoring points are located at the ends of the arms.

7. A tire according to claim 6, wherein there are four, essentially orthogonal, arms.

8. A tire according to claim 6, wherein there are three arms spaced essentially at intervals of 120° from one another.

9. A tire according to claim 1, wherein the anchoring points are designed to cooperate with anchoring means.

10. A tire according to claim 9, wherein the anchoring means comprises a cap which protects the deformable element, the cap being fixed to the anchoring points.

11. A tire according to claim 9, wherein the anchoring means comprises a frame.

12. A tire according to claim 9, wherein the anchoring means comprises sockets.

13. A tire according to claim 1, wherein the shank and the deformable element are made on the basis of materials such as silicon, quartz or a metal.

14. A tire according to claim 1, wherein the measurement means comprises at least three deformation measurement devices distributed on the deformable element.

15. A tire according to claim 14, wherein the measurement devices are piezoelectric or piezoresistive gauges.

16. A tire according to claim 14, wherein the measurement devices are condensers.

17. A tire according to claim 16, wherein a first electrode of the condensers is in contact with the deformable element.

18. A tire according to claim 14, wherein the measurement devices are arranged along the <110> crystal axes of the deformable element.

19. A tire according to claim 1, wherein the measurement means comprises at least three deformation measurement devices distributed on the deformable element, the measurement devices are piezoelectric or piezoresistive gauges or in part condensers, the anchoring points are designed to cooperate with anchoring means, the anchoring means comprises a cap that protects the deformable element, and the cap is hermetically fixed to the anchoring points.

20. A tire according to claim 1, comprising a reinforcement armature and a tread, the tread comprising a part designed to undergo wear, in which the sensor is arranged in the tread between the part designed to undergo wear and the reinforcement armature.

21. A tire according to claim 1, comprising an accessory of larger size than the sensor and associated therewith.

22. A tire according to claim 21, in which the material constituting the accessory is chosen from the group consisting of a metal, a polymer, and a ceramic.

23. A tire according to claim 1, in which the sensor is provided on its outer face with one or more spikes.

24. A tire according to claim 23, in which the material constituting the spike or spikes is chosen from the group consisting of a metal, a polymer and a ceramic.

25. A tire according to claim 1, in which the tire includes a tread and the sensor is associated with a base positioned in a non-wearing zone of the tread, between the sensor and the surface of the tread.

26. A tire according to claim 25, in which the material constituting the base is chosen from the group consisting of a metal, a ceramic, a polymer, silicon, and a composite consisting of a filled elastomer matrix and a material such as those used in the production of reinforcement armatures for tires.

27. A tire according to claim 1, comprising a sidewall and a bead, in which the sensor is implanted between the sidewall and the bead.

28. A tire according to claim 1, comprising a sidewall and a shoulder, in which the sensor is implanted between the sidewall and the shoulder.

* * * * *